United States Patent
Hosoi (10) Patent No.: US 8,643,887 B2
(45) Date of Patent: *Feb. 4, 2014

(54) IMAGE PROCESSING DEVICE THAT PERFORMS IMAGE PROCESSING FOR VARIOUS FUNCTIONS AND METHOD FOR PERFORMING IMAGE PROCESSING FOR VARIOUS FUNCTIONS

(71) Applicant: Oki Data Corporation, Tokyo (JP)

(72) Inventor: Tetsuya Hosoi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,479

(22) Filed: Apr. 4, 2013

(65) Prior Publication Data
US 2013/0222834 A1  Aug. 29, 2013

Related U.S. Application Data (63) Continuation of application No. 12/461,781, filed on Aug. 25, 2009, now Pat. No. 8,427,677.

(30) Foreign Application Priority Data

Sep. 19, 2008  (JP) ................................ 2008-241227

(51) Int. Cl.
*H04N 1/40* (2006.01)
(52) U.S. Cl.
USPC ......................................... 358/1.15; 358/468
(58) Field of Classification Search
USPC ............ 358/1.8–1.9, 1.15, 2.1, 468, 435–439
See application file for complete search history.

(56) References Cited

U.S. PATENT DOCUMENTS

| | | | |
|---|---|---|---|
| 5,557,367 A | 9/1996 | Yang et al. | |
| 5,729,790 A | 3/1998 | Conley et al. | |
| 6,097,500 A | 8/2000 | Fromherz | |
| 7,701,605 B2 | 4/2010 | Miyata | |
| 7,787,138 B2 | 8/2010 | Lofthus et al. | |
| 8,427,677 B2 * | 4/2013 | Hosoi | 358/1.15 |

FOREIGN PATENT DOCUMENTS

| | | |
|---|---|---|
| JP | 2002-197439 A | 7/2002 |
| JP | 2003-034061 A | 2/2003 |
| JP | 2004-363995 A | 12/2004 |
| JP | 2006-074545 A | 3/2006 |
| JP | 2006-344214 A | 12/2006 |
| JP | 2007-260989 A | 10/2007 |
| JP | 2008-178066 A | 7/2008 |

\* cited by examiner

*Primary Examiner* — Thomas D Lee
*Assistant Examiner* — Stephen M Brinich
(74) *Attorney, Agent, or Firm* — Muncy, Geissler, Olds & Lowe, PLLC (57) ABSTRACT

Image processing restriction information that defines time of day restrictions of a first function and time of day restrictions of a second function is stored in a memory unit. An image processing request for image processing of one of the first and second functions is received. Based on time managed by a time management unit, a time of the image processing request and the image processing restriction information, an image processing restriction corresponding to the first function or the second function is determined based on the received image processing request for image processing of the corresponding function. An image processing restriction is performed based on the determining of the image processing restriction corresponding to the first function and the determining of the image processing restriction corresponding to the second function.

21 Claims, 11 Drawing Sheets

| Image Processing Jobs | Time of Day | | | | Weekend and non-business days |
|---|---|---|---|---|---|
| | Weekday | | | | |
| | A<br>8:00~17:59 | B<br>18:00~20:59 | C<br>21:00~23:59 | D<br>0:00~7:59 | |
| Copy | Allowed | High-Resolution Copying is prevented | Color Copies are Prevented | Prevented | Prevented |
| Print | Allowed | Number of Pages is Limited | Color Printing is Prevented | Prevented | Prevented |
| Scan to Email | Allowed | File Size is Limited | Color Scans are Prevented | Prevented | Prevented |
| Scan to Folder | Allowed | Prevented When Destination is Outside Firm | Color Scans are Prevented | Prevented | Prevented |
| Scan to Portable Memory | Allowed | Over 200 dpi is Prevented | Prevented | Prevented | Prevented |
| PC Scan | Allowed | Number of Pages is Limited | High Resolution and Color Scans are Prevented | Prevented | Prevented |
| Facsimile Transmission | Allowed | Number of Pages is Limited | High Resolution and Color Scans are Prevented | Prevented | Prevented |
| Facsimile Reception | Allowed | Allowed | Allowed | Allowed | Allowed |

| Data and Time Management Method info. Items | Operation Status | | |
|---|---|---|---|
| | Regular Operation | | Operation Under Image Processing Restriction |
| | Manual Management | Automatic Management | Automatic Management |
| Management Method | Manual | Automatic | Automatic |
| Ability to Chang Management Method | Allowed | Allowed | Not Allowed |
| Ability to Manually Change Date and Time Info. | Allowed and Write Input Info. into Date and Time Info. | Not Allowed | Not Allowed |
| Source for Acquisition in Automatic Operation | | SNTP Server | SNTP Server |
| Time Interval for Acquisition in Automatic Operation | | 10 Minutes | 1 Minute |

IMAGE PROCESSING DEVICE THAT PERFORMS IMAGE PROCESSING FOR VARIOUS FUNCTIONS AND METHOD FOR PERFORMING IMAGE PROCESSING FOR VARIOUS FUNCTIONS

CROSS REFERENCE TO RELATED APPLICATION

The present application is a continuation of U.S. patent application Ser. No. 12/461,781, filed Aug. 25, 2009, and is related to, claims priority from and incorporates by reference Japanese Patent Application No. 2008-241227, filed on Sep. 19, 2008.

TECHNICAL FIELD

The present application relates to an image processing device processing an image based on inputted image data.

DESCRIPTION OF RELATED ART

In recent years, an image processing device has been connected to a network for transmitting and receiving image data between a server and a terminal device on the network. The image processing device can process several types of image data because the image processing device has a mechanism for reading and scanning a manuscript, and the image processing device transmits and receives a document by facsimile through a facsimile line. In such image processing devices, usability is increased; however, since it is easy to print and send confidential information, disclosure of confidential information is likely to occur. Therefore, the need for security is increased with such a device.

Japanese laid-open patent application No. 2007-260989 discloses an image processing device that has a function to prevent unauthorized use of image data. In this reference, a level of print authorization is appended to image data; and since the level of print authorization is varied by the time of day, unauthorized use is prevented.

However, in this reference, image data without the level of print authorization can be easily outputted. Even if the level of print authorization is appended to image data, if an authentication means for a device is a certain password or an IC card and those authentication means are leaked to a third person, image data can be easily outputted. Therefore, a person with malicious intent may be able to acquire image data from a conventional image processing device without authorization.

SUMMARY

In order to resolve problems described above, the present application discloses the following configuration.

An image processing device that performs image processing for first and second functions includes a time management unit that is configured to manage time, a memory unit that is configured to store image processing restriction information that defines time of day restrictions for the first function and time of day restrictions for the second function, a device management unit that is configured to receive an image processing request for image processing of one of the first and second functions, and an image processing restriction unit that is configured, based on the time managed by the time management unit, a time of the image processing request and the image processing restriction information, to determine an image processing restriction corresponding to the first function if the device management unit receives the image processing request for image processing of the first function, and to determine an image processing restriction corresponding to the second function if the device management unit receives the image processing request for image processing of the second function. The device management unit is configured to perform one of the image processing restriction corresponding to the first function and the image processing restriction to the second function, based on a determination made by the image processing restriction unit.

In a method for performing image processing for first and second functions, time is managed by a time management unit. Image processing restriction information that defines time of day restrictions of the first function and time of day restrictions of the second function is stored in a memory unit. An image processing request for image processing of one of the first and second functions is received. Based on the time managed by the time management unit, a time of the image processing request and the image processing restriction information, an image processing restriction corresponding to the first function is determined if the image processing request for image processing of the first function is received, and the image processing restriction corresponding to the second function is determined if the image processing request for image processing of the second function is received. An image processing restriction is performed based on the determining of the image processing restriction corresponding to the first function and the determining of the image processing restriction corresponding to the second function.

DETAILED DESCRIPTION OF EMBODIMENT

An embodiment of the present application is explained below. A multifunction machine serving as an image processing device is explained.

[First Embodiment]

Figure 2:
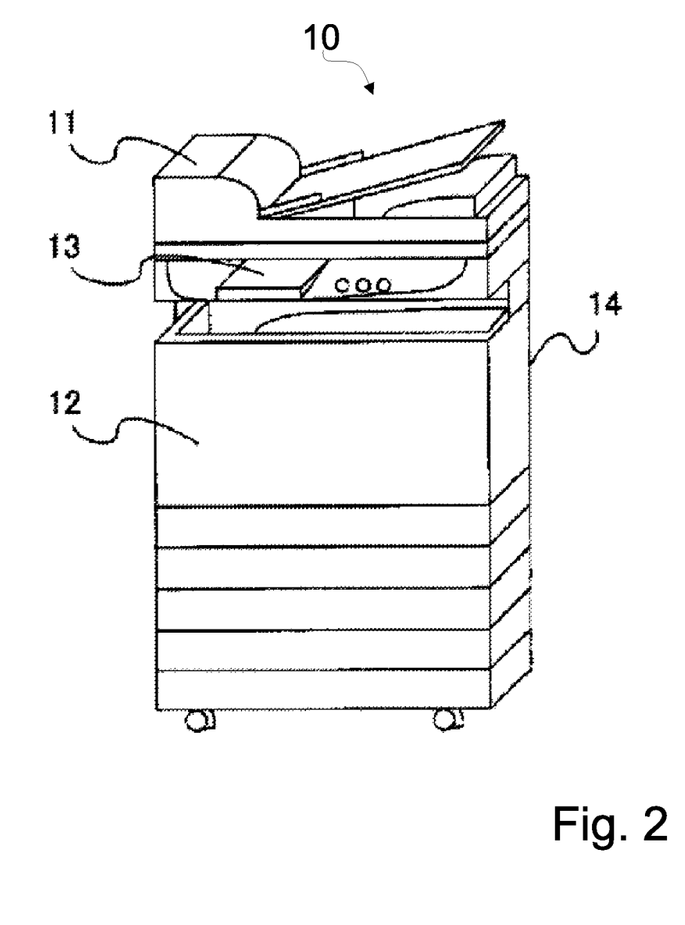
FIG. 2 is a perspective view of a multifunction machine according to the present application.

FIG. 2 is a perspective view of a multifunction machine according to the present application. As shown in FIG. 2, the multifunction machine includes a reader unit 11, a print unit 12, an operation panel unit 13, and a communication unit 14. The reader unit 11 is a scanner using a read sensor, such as a CMOS sensor or a CCD sensor. The reader unit 11 reads a manuscript, converts the read manuscript into an electric signal, and then converts the electric signal to image data.

The print unit 12 is, for example, an electrophotographic system. The print unit 12 prints image data that is read by the reader unit 11 and image data that is received by the communication unit 14 through a communication line and an external interface. The operation panel 13 is configured with operation switches, which a user manipulates to operate the multifunction machine 10, and a display panel, which displays status and other information relating to the multifunction machine 10 for the user.

Figure 3:
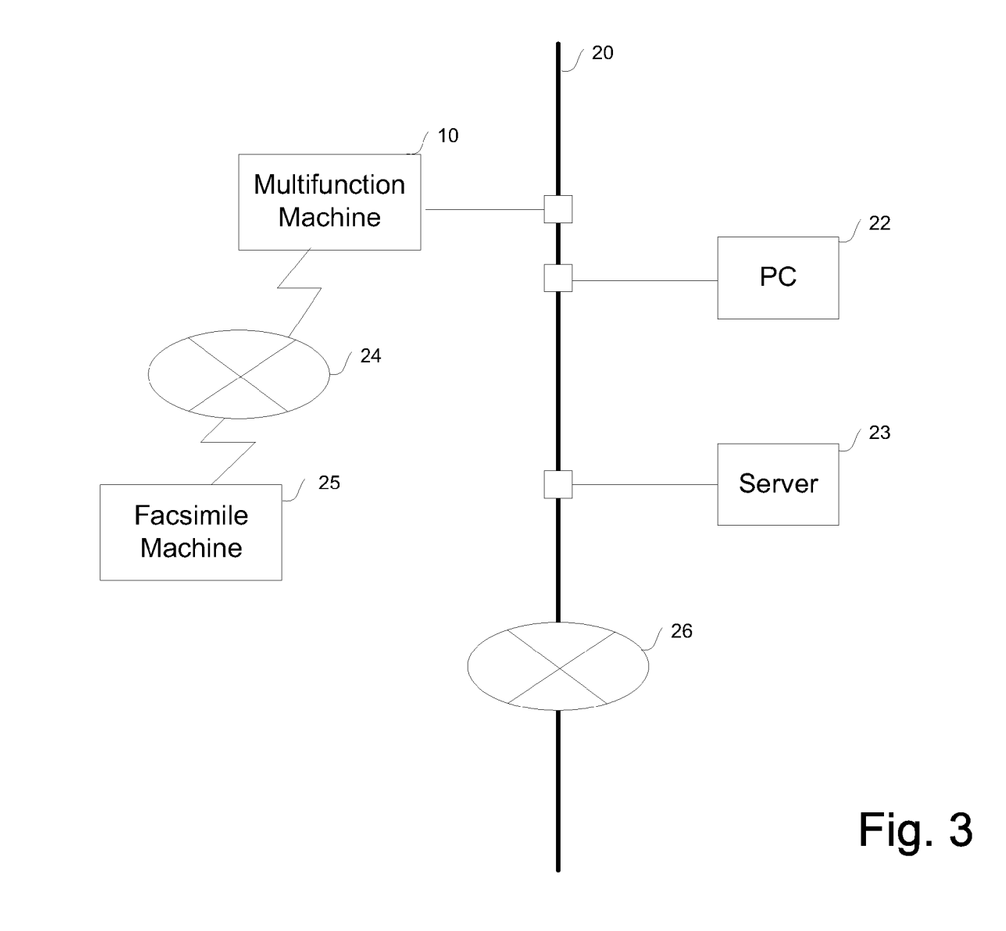
FIG. 3 is a system configuration diagram including a multifunction machine according to the present application.

FIG. 3 is a system configuration diagram including the multifunction machine 10. As shown in FIG. 3, the multifunction machine 10 is connected to a computer (PC) 22 and a server 23 through a LAN 20. The multifunction machine 10 further is connected to a digital communication network 26 through a digital service unit (DSU) and a terminal adapter (TA). The multifunction machine 10 also is connected to a facsimile machine 25 through an analog communication network 24.

Figure 1:
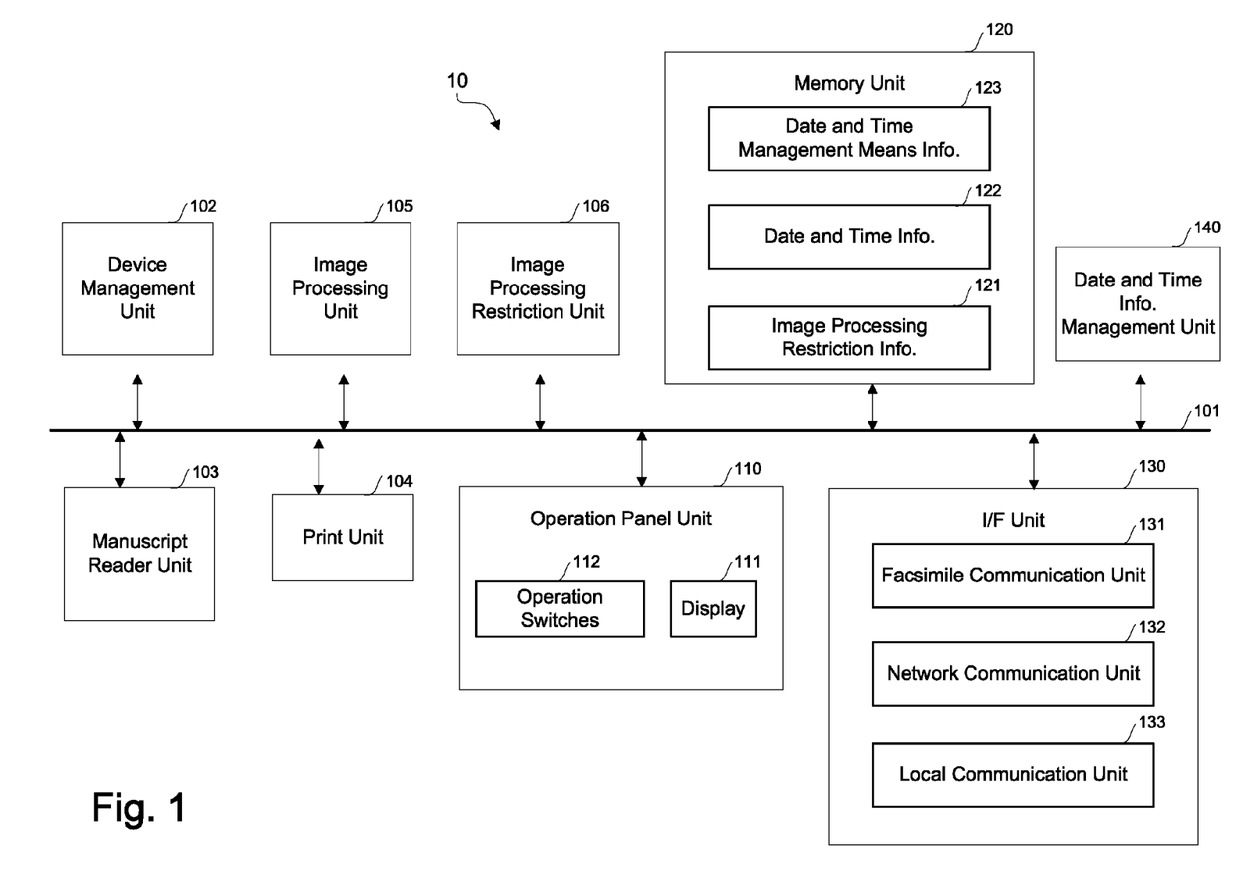
FIG. 1 is a block diagram showing a structure of a multifunction machine according to a first embodiment.

The structure of the multifunction machine 10 according to the first embodiment is explained below. FIG. 1 is a block diagram showing the structure of the multifunction machine according to the first embodiment. As shown in FIG. 1, the multifunction machine 10 includes a device management unit 102, a manuscript reader unit 103, a print unit 104, an image processing unit 105, an image processing restriction unit 106, an operation panel unit 110, a memory unit 120, an I/F unit 130, and a date and time information management unit 140.

The device management unit 102 conducts integrated management of status for each unit and controls each unit with respect to each event. The device management unit 102 manages to classify a time of day according to the present application. For example, the device management unit 102 determines that 9:00 a.m. is a time of day A (discussed later), at which people use devices most. The manuscript reader unit 103 is configured with a scanner that scans a manuscript put on a platen. The image processing unit 105 converts, for example, manuscript information read by the manuscript reader unit 103 and print information received from a host device into image data. The print unit 104 prints converted image data on a recording medium.

The operation panel unit 110 includes a display 111 that displays an instruction and information for a user of the device and operation switches 112, such as a touch panel or a key board, for inputting instructions and information from the user of the device.

The I/F unit 130 administers exchange of data with external devices. The I/F unit 130 includes a facsimile communication unit 131 that conducts facsimile communication through an analog communication network 24, a network communication unit 132 that conducts data communication through a LAN 20, and a local communication unit 133 that conducts data communication through a USB, IEEE 1284, or IEEE 1394 interface or the like.

The image processing restriction unit 106 notifies the device management unit 102 about an executable function of image processing based on image processing restriction information 121 (discussed later) according to a time of day developed in a random access memory, or RAM, (not shown) for each event. A date and time information management unit 140 reads date and time management method information 123 (discussed later) and determines whether time correction that is entered through the operation switches 112 by a user and time correction that is instructed through the I/F unit 130 by a host device are possible. When the date and time information management unit 140 determines that the time correction corresponds to information of the date and time management method information 123, the date and time information management unit 140 writes the corrected time into date and time information 122.

For example, the date and time information management unit 140 acquires the current time from a simple network time protocol (SNTP) server through a network communication unit 132 and writes the acquired current time into the date and time information 122.

A memory unit 120 stores a variety of information within the multifunction machine 10. For example, the memory unit 120 is a nonvolatile memory, such as an electrically erasable programmable read-only memory (EEPROM). The memory unit 120 stores the image processing restriction information 121 that is used by an image processing restriction unit 106 to determine whether or not a function is an executable image processing function, the date and time information 122 containing a time, a day of the week, and a date (year, month, and day) that is managed by the date and time information management unit 140, and the date and time management method information 123, which defines a method by which the date and time information 122 can be changed, for example, manual adjustment by a user or automatic adjustment by a SNTP server. The device management unit 102 stores the information in the memory 120 in a RAM (not shown), and applies it in making decisions according to operation requests.

The date and time information 122 is constantly updated by a real time clock (RTC) that counts time. This is done, for example, by the date and time information management unit 140.

Figure 4:
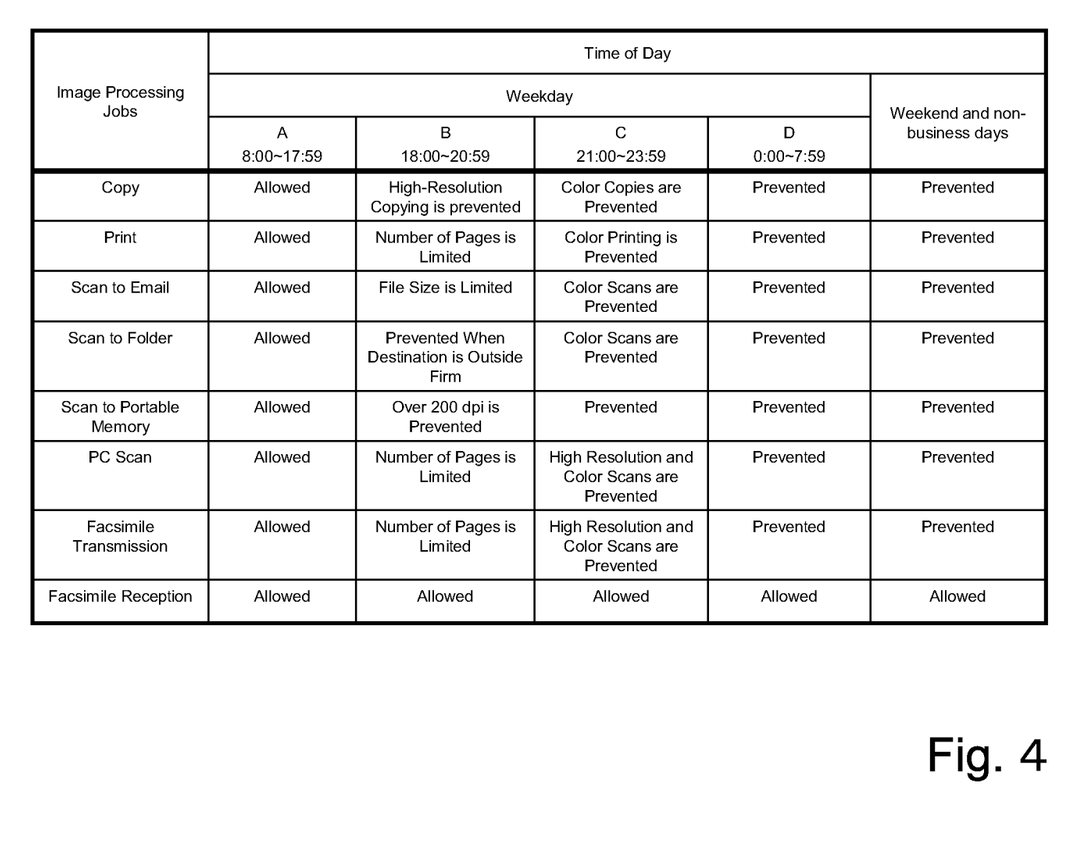
FIG. 4 is a table of image processing restriction information of a multifunction machine according to a first embodiment.

The following is an explanation of the image processing restriction information 121, which restricts image processing jobs based on a time of day according to the first embodiment. FIG. 4 is a table of the image processing restriction information 121 of a multifunction machine 10 according to the first embodiment. The table of FIG. 4 represents a predetermined set of rules governing restriction of image processing. As shown in FIG. 4, in a column of image processing jobs, typical image processing job names (such as a copy, and a print) are listed.

First, the time of day is divided into the following two categories: weekday and weekend. The weekday category is divided into four categories of the time of day based on the expected number of users of a device. The division of the time of day into four categories is managed by the device management unit 102. A time of day A represents a time of regular work hours from 8:00 to 17:59 during which the device is used the most. A time of day B represents a time of overtime hours from 18:00 to 20:59 during which the number of users is less compared to the time of day A. A time of day C also represents a time of overtime hours from 21:00 to 23:59 in which the number of users is less compared to the time of day B. A time of day D represents a time from 0:00 to 7:59 in which the least number of users are expected to use the device.

Note that a 24 hour clock is used in the times given in this description. Also, the term "weekday" refers to normal business days, which are usually Monday through Friday, and the term "weekend" refers to not only Saturday and Sunday but holidays and non-business days.

The following is an explanation of the restriction of functions with respect to the time of day for copy jobs. As shown in the table of FIG. 4, copy jobs are always allowed for all functions without any restrictions on functions during the time of day A on weekdays. As also shown in FIG. 4, in the time of day B on weekdays, copy jobs are allowed in a low-resolution (for example, 200 dpi) image mode and are prevented, or blocked, in a high-resolution (for example, 600 dpi) image mode. Thus, in this case, the restriction is an imposition of a limit on image resolution.

In the time of day C on weekdays, copy jobs are allowed in black and white, and color copies are prevented, as shown in FIG. 4. In the time of day D on weekdays, copy jobs are totally prevented, as shown in FIG. 4. As discussed above, copy jobs are allowed in the time of day A, however, during a time of day in which the number of users is small, color copies and high resolution copies are prevented. Therefore, unauthorized copying that may involve misappropriation of valuable information is more difficult.

On weekends, copy jobs are also totally prevented, or blocked.

The following is an explanation of functions with respect to the time of day for print jobs. As shown in FIG. 4, print jobs are always allowed for all functions without any restrictions during the time of day A on weekdays. In the time of day B on weekdays, print jobs are allowed up to a certain number of pages (for example, up to 100 pages), and are prevented for jobs over a certain number of pages (for example, over 100 pages).

In the time of day C on weekdays, print jobs are restricted in the same manner as copy jobs except that there is a limit on the number of pages printed during time of day B on weekdays. In the time of day D on weekdays and on weekends, print jobs are totally prevented.

As discussed above, print jobs are allowed without any restrictions of functions in the time of day A, however, during a time of day in which the number of users is small, there is a limit on the number of pages that can be printed. Therefore, unauthorized taking of confidential information is more difficult.

The following is an explanation of restrictions on functions with respect to the time of day for scan to e-mail jobs. As shown in FIG. 4, scan to e-mail jobs are always allowed for all functions without any restrictions during the time of day A on weekdays. In the time of day B on weekdays, scan to e-mail jobs are allowed up to a certain file size of scanned data (for example, up to 5 MB) and are restricted for file sizes over the certain file size of scanned data (for example, over 5 MB).

In the time of day C on weekdays, scan to e-mail jobs are allowed for black and white data up to a certain file size (for example, 2 MB), and color data is prevented. In the time of day D on weekdays and weekends, scan to email jobs are totally prevented.

As discussed above, scan to email jobs are allowed without any restrictions of functions in the time of day A, however, during a time of day in which the number of users is small, there are restrictions concerning file size and color. Therefore, with these restrictions, unauthorized taking of confidential information is more difficult.

The following is an explanation of restrictions of jobs that involve scanning to a folder of a storage device. As shown in FIG. 4, scan to folder jobs are always allowed for all functions without any restrictions on functions during the time of day A on weekdays. In the time of day B on weekdays, scan to folder jobs are allowed to a computer (PC) or a server connected to an intranet, or local area network, of a company and are prevented if the folder is on a PC or a server connected to a network outside the company, as shown in FIG. 4.

In the time of day C on weekdays, scan to folder jobs are allowed for scanned black and white data to a folder on a PC or a server connected to an intranet of the company and are prevented for color data, as shown in FIG. 4. In the time of day D on weekdays and weekends, scan to folder jobs are totally prevented, as shown in FIG. 4.

As discussed above, scan to folder jobs are allowed for without any restrictions of functions in the time of day A, however, during a time of day in which the number of users is small, there are restrictions on destination and color data. Therefore, with these restrictions, unauthorized taking of confidential information is more difficult.

The following is an explanation of restrictions on functions with respect to the time of day for scan to portable memory jobs. Portable memory refers to portable drives or miniature memory cards that use the common USB interface or another standard PC interface. As shown in FIG. 4, scan to portable memory jobs are always allowed for all functions without any restrictions on functions during the time of day A on weekdays. In the time of day B on weekdays, scan to portable memory jobs are allowed when the scanned resolution is equal to or less than 200 dpi and are prevented when the scanned resolution is over 200 dpi, as shown in FIG. 4.

In the times of day C and D on weekdays, scan to portable memory jobs are totally prevented, as shown in FIG. 4. With respect to a removable memory, such as a portable memory, that is easily carried, since output to portable memory is restricted entirely during much of the day, unauthorized taking of confidential information is more difficult.

On weekends and non-business days, such as holidays, restrictions on scan to portable memory jobs are the same as those of the time of day D. However, for example, scan to portable memory may be allowed in a certain period of the day on weekends, so that users who work on weekends have access to this function.

The following is an explanation of the restrictions on PC scan jobs. A scan to folder job, as discussed above, is controlled and managed by the multifunction machine itself. In contrast, a PC scan job is controlled and managed by a PC connected to an intranet of a company. In other words, the scanner function of the multifunction machine is controlled and managed by the PC. The scanned data under a PC scan job is typically stored in a local hard drive of the PC. As shown in FIG. 4, PC scan jobs are always allowed for all functions without any restrictions on functions during the time of day A on weekdays. In the time of day B on weekdays, PC scan jobs are allowed up to a certain number of pages (for example, up to 50 pages), and are prevented over the certain number of pages (for example, over 50 pages).

In the time of day C on weekdays, PC scan jobs are allowed in a black and white data with the same or more strict scanning page number restrictions as the time of day B. Further, PC scan jobs using color data are prevented. In the time of day D on weekdays and on weekends, PC scan jobs are totally prevented.

As discussed above, PC scan jobs are allowed without any restrictions of functions in the time of day A, however, during a time of day in which the number of users is small, there are limits on the number of scanned pages an on color scanning. With these restrictions, unauthorized taking of confidential information is more difficult.

The following is an explanation of restrictions with respect to the time of day for facsimile transmission jobs. As shown in FIG. 4, facsimile transmission jobs are always allowed for all functions without any restrictions on functions during the time of day A on weekdays. In the time of day B on weekdays, facsimile transmission jobs are allowed up to a certain number of pages (for example, up to 20 pages) and are restricted for scans over a certain number of pages (for example, over 20 pages).

In the time of day C on weekdays, facsimile transmission jobs are allowed in a black and white or in a regular (lower) color resolution with the same or more strict page number restrictions as the time of day B. Further, facsimile transmission of data in color or with extra-fine or photo resolutions is prevented in time of day C. In the time of day D on weekdays and on weekends, facsimile transmission jobs are totally prevented.

As discussed above, facsimile transmission jobs are allowed without any restrictions of functions in the time of day A, however, during a time of day in which the number of users is small, there are limits on the transmission page number, and high-resolution and color facsimile transmissions are prevented. Therefore, with these restrictions, unauthorized taking of confidential information is more difficult.

Finally, facsimile reception jobs are triggered by another device. Therefore, during all times of day on weekdays and on weekends, facsimile reception jobs are allowed without any restrictions.

Figure 5A:
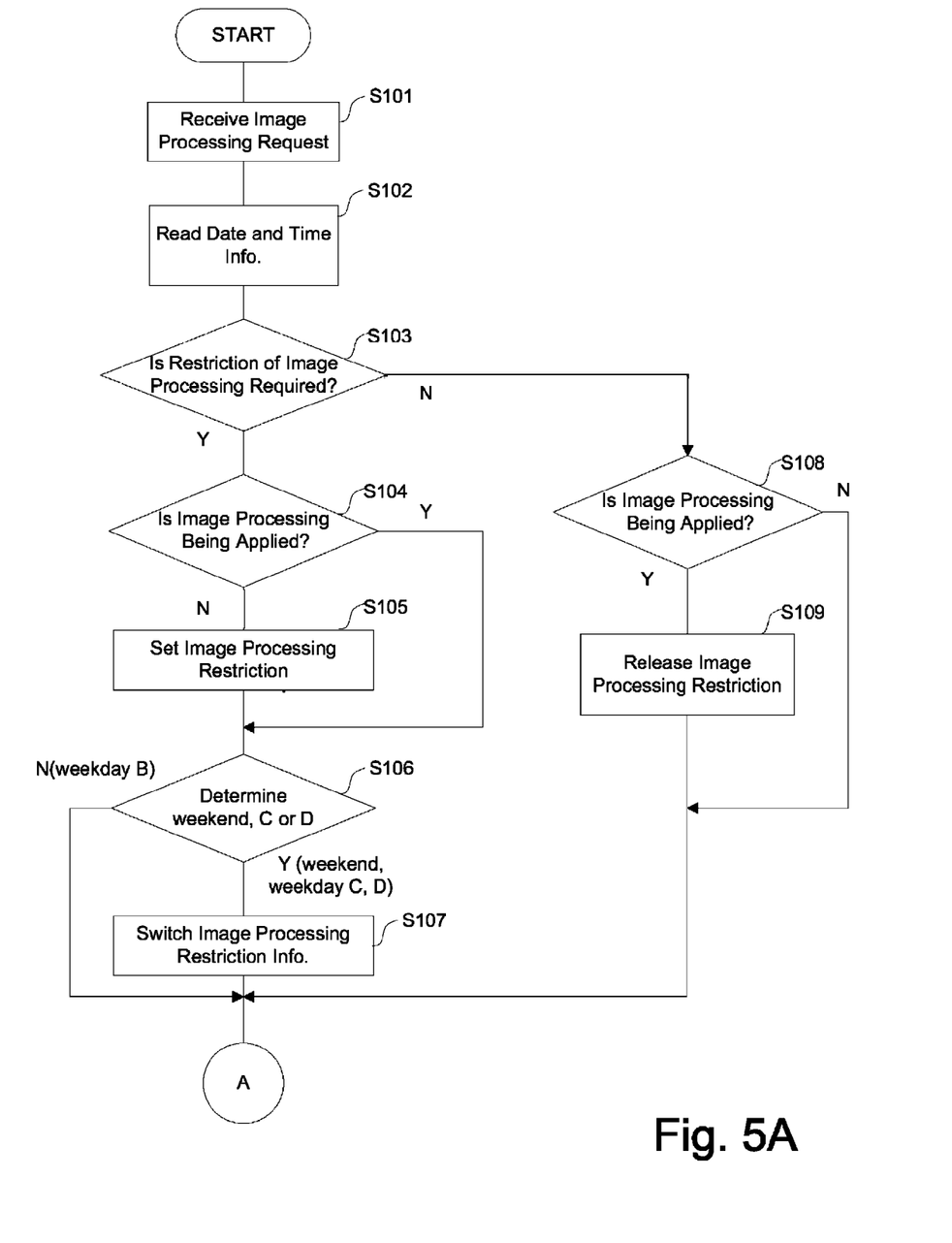
FIGS. 5A and 5B are flow diagrams showing an overall image processing of a multifunction machine according to a first embodiment.
Figure 5B:
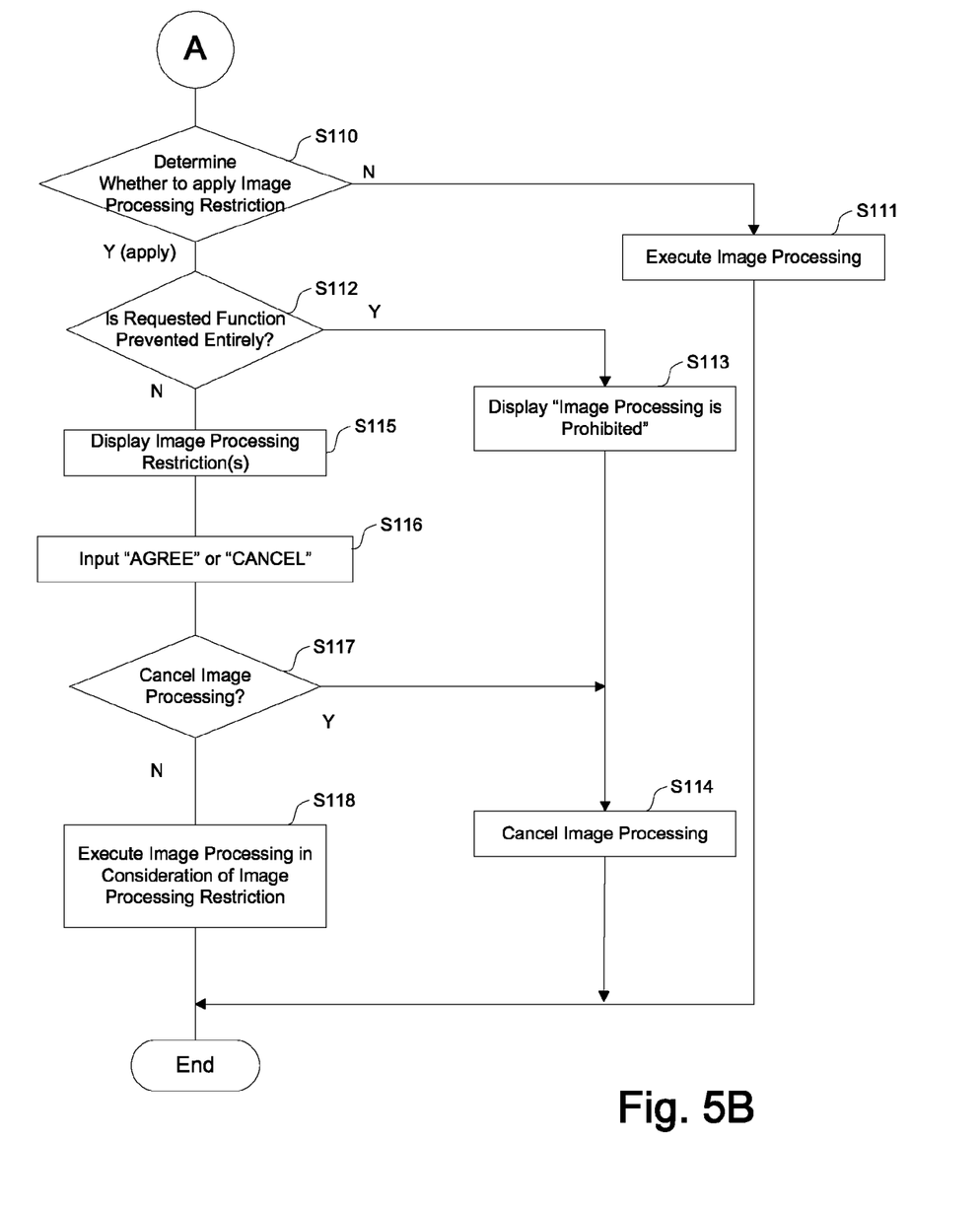

The following is an overall explanation of the multifunction machine 10. FIGS. 5A and 5B are flow diagrams showing image processing of a multifunction machine according to the first embodiment. Operation of the multifunction machine 10 according to the first embodiment is explained below in the order of steps S101 through S118 with reference to FIG. 1.

(S101) The multifunction machine 10 receives an image processing request by a user through operation switches 112 or an I/F unit 130.

(S102) When a device management unit 102 receives an image processing request, the device management unit 102 reads data and time information 122 stored in the memory unit 120 through the date and time information management unit 140 to determine whether or not it is a time of day to conduct an image processing restriction.

(S103) The device management unit 102 decides whether or not the restriction of image processing is required based on the read date and time information 122. When the current time of day is such that it is required to conduct an image processing restriction, i.e., the current time is within any of the time of day B, C, and D on weekdays and on weekends, the operation goes to S104. When the time of day is such that it is not required to restrict image processing, i.e., the current time is within the time of day A, the operation goes to S108.

(S104) Since the read date and time information 122 is within one of the times of day B, C, and D on weekdays and on weekends that require restrictions, the device management unit 102 instructs the image processing restriction unit 106 to confirm whether or not it is applying the image processing restriction. When f the image processing restriction is being applied, the operation goes to S106. When the image processing restriction is not being applied, the operation goes to S105.

(S105) At this step, even though the current date and time information 122 is in one of the times of day B, C, and D on weekdays and on weekends in which an image processing restriction should be applied, the image processing restriction is not actually applied, so the device management unit 102 instructs the image processing restriction unit 106 to set the image processing restriction.

(S106) The device management unit 102 reads the day of the week and time from the date and time information 122 to determine the current time in imposing an image processing restriction. In particular, the device management unit 102 determines whether or not the current time of day is within a weekend or one of times C and D on a weekday. When the current time of day is within the time of day B on a weekday, the operation goes to S110. When the time of day falls in a weekend or in times of day C and D on a weekday, the operation goes to S107.

(S107) When the current date and time information 122 is within one of the times of day C and D on a weekday or is within a weekend, the device management information 102 switches the image processing restriction information 121 to other image processing restriction information 121 that corresponds to the date and time information 122.

(S108) In step S103, when the device management unit 102 determines that the time of day is such that an image processing restriction is not required, i.e., the current time is within the time of day A on a weekday, the device management unit 102 instructs the image processing restriction unit 106 to confirm whether or not an image processing restriction is being applied. When an image processing restriction is being applied, the operation goes to S109. When no image processing restriction is being applied, the operation goes to S110.

(S109) In this step, even though the current date and time information 122 is in the time of day A on a weekday, in which no image processing restriction should be applied, an image processing restriction is actually being applied, so the device management unit 102 instructs the image processing restriction unit 106 to release the image processing restriction.

(S110) The device management unit 102 determines whether or not an image processing restriction is required, according to the time of day, on the requested image processing. When the current time of day is in the time of day A on a weekday, in which no image processing restriction is required, the operation goes to S111. When the current time of day is within a weekend or in the times of day B, C, and D on a weekday, the operation goes to S112.

(S111) When the current time of day is in the time of day A, in which no restriction is required, the device management unit 102 executes the requested image processing.

(S112) When the current time of day is within a weekend or in the times of day B, C, and D on a weekday, in which image processing restriction is required, the device management unit 102 instructs the image processing restriction unit 106 to confirm whether the requested image processing function is entirely prevented. The image processing restriction unit 106 determines whether the requested function is prevented or limited based on image processing restriction information 121. When the requested function is entirely prevented, or blocked, the operation goes to S113. When the requested function is not prevented but is limited, the operation goes to S115.

(S113) When the requested function is entirely prevented, the device management unit 102 instructs the display of message indicating that the requested image processing function is prohibited at the display 111 for notifying the user.

(S114) Then, the device management unit 102 cancels image processing, destroys image data for the requested image processing, and waits for a next operation request.

(S115) When there is an image processing restriction, or limit, with respect to the requested image processing function, the device management unit 102 instructs that the image processing restriction(s) be displayed at the display 111 for notifying the user.

(S116) After the user recognizes the image processing restriction through the display 111, the user inputs either an indication of agreement with the restriction or cancellation of the requested image processing through the operation switches 112.

(S117) The device management unit 102 divides an operation based on the user's input of either agreement with the restriction or cancellation of the requested image processing.

When the user agrees to the image processing restriction, the operation goes to S118. When the user cancels the requested image processing, the operation goes to S114.

(S118) Upon the user's agreement to the image processing restriction, the device management unit 102 instructs an image processing unit 105 to execute the requested image processing in consideration of the image processing restriction, and finishes the operation.

According to the first embodiment discussed above, since the degree of likelihood of unauthorized use of a multifunction machine relates largely to the time of day, and enablement of image processing is limited depending on the time of day, unauthorized use of the multifunction machine is more difficult. In the multifunction machine, it is possible that unauthorized use is restricted for image data that does not have a level of print authorization.

[Second Embodiment]

Figure 6:
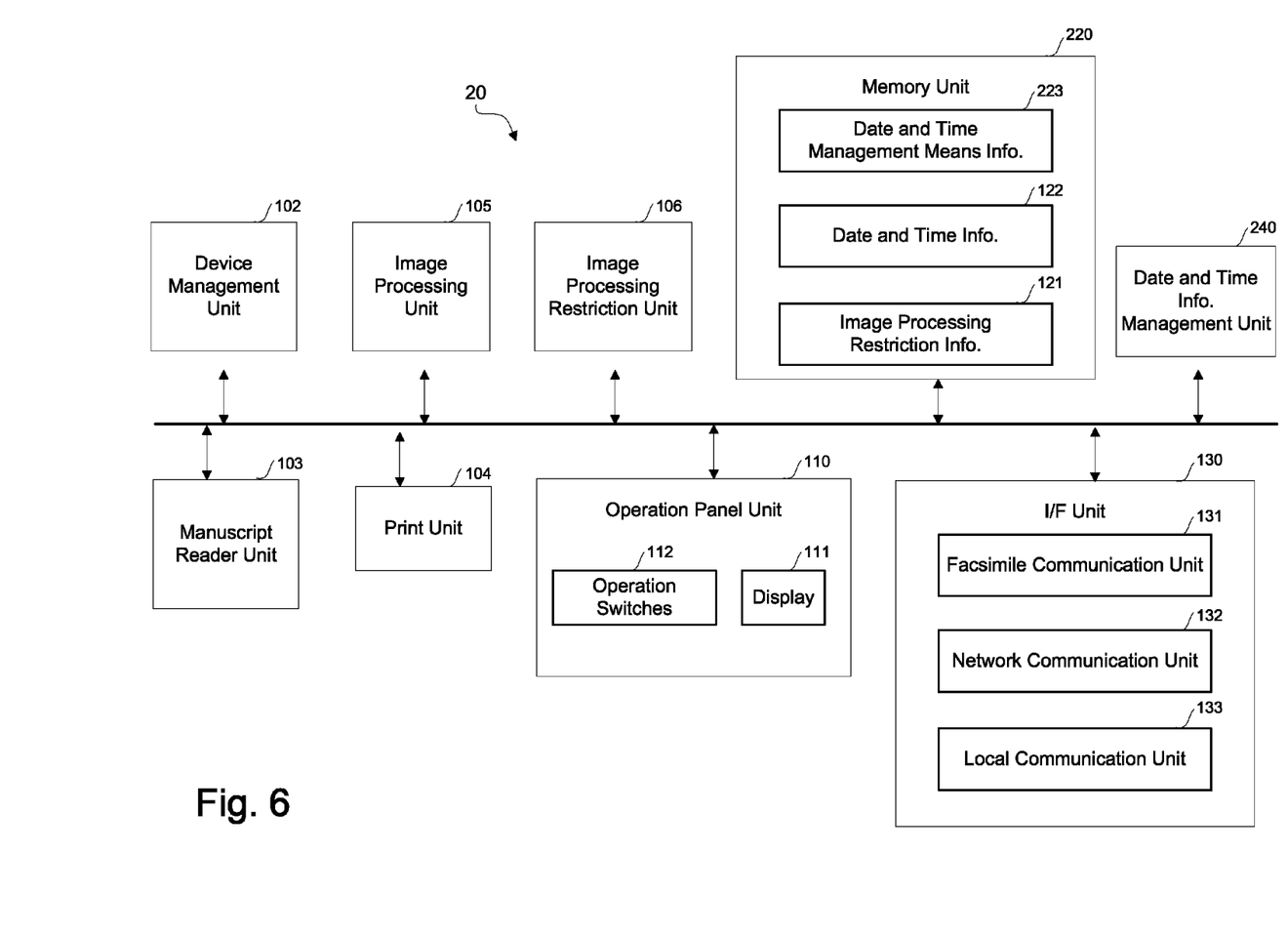
FIG. 6 is a block diagram showing a structure of a multifunction machine according to a second embodiment.

In a second embodiment, the time used for determining the time of day in a multifunction machine cannot be changed by a person with malicious intent, so that taking of confidential information is more difficult. FIG. 6 is a block diagram showing a configuration of a multifunction machine according to the second embodiment. As shown in FIG. 6, a multifunction machine 20 is configured with a device management unit 102, a manuscript reader unit 103, a print unit 104, an image processing unit 105, an image processing restriction unit 106, an operation panel unit 110, a memory unit 220, an I/F unit 130, and a date and time information management unit 240.

Parts that are different from the first embodiment are explained in detail below. Elements that are the same as corresponding elements of the first embodiment have the same reference numeral and are not explained to avoid redundancy.

The memory unit 220 stores a variety of information within the multifunction machine 20. For example, the memory unit 220 is a nonvolatile memory, such as an EEPROM. The memory unit 220 stores image processing restriction information 121, which is used by an image processing restriction unit 106 to determine whether a function is an executable image processing function, date and time information 122 containing a time, a day of the week, and a date (year, month, and day), which is managed by a date and time information management unit 240, and date and time management method information 223, which defines a method by which the date and time information 122 can be adjusted, for example, manual adjustment by a user or automatic adjustment by an SNTP server. In the second embodiment, when an image processing restriction is applied, the date and time information 122 can be changed only by the automatic adjustment method. Therefore, changing the time by a person with malicious intent is prevented, which makes it more difficult to circumvent the restrictions the machine.

The date and time information management unit 240 reads the date and time management information 223, and determines whether time correction that is entered through the operation switches 112 by a user and time correction that is instructed through the I/F unit 130 by a host device are possible. When the time correction is possible, the date and time information 122 is changed with the corrected time. As discussed above, when an image processing restriction is applied, the date and time information management unit 240 corrects the time only by the automatic adjustment method.

In the first embodiment, the date and time information management unit 140 acquires the current time from an SNTP server through a network communication unit 132 and writes the acquired current time into the date and time information 122. In addition to that, the date and time information management unit 240 can acquire the current time through, for example, a network time protocol (NTP) server, a radio-controlled clock, or a GPS clock, and can write the acquired current time into the date and time information 122.

Figure 7:
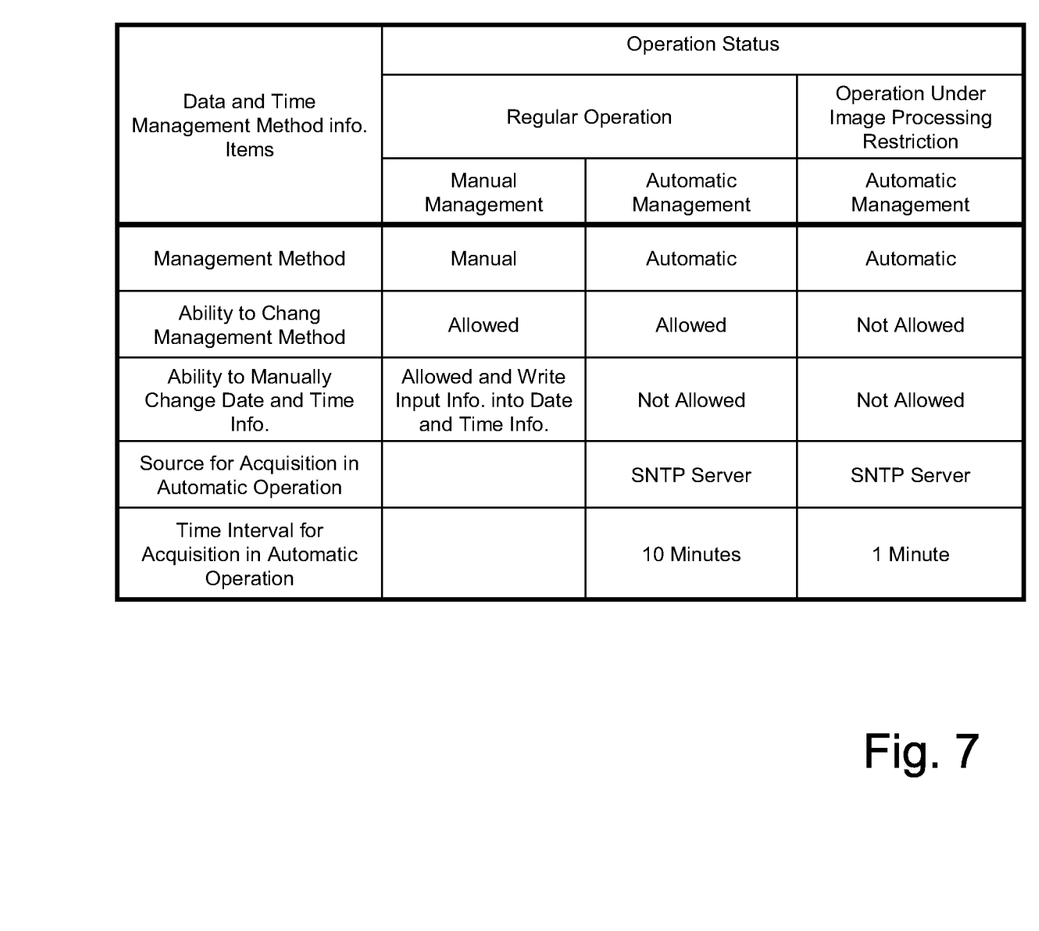
FIG. 7 is a table of date and time management information of a multifunction machine according to a second embodiment.

The following is an explanation of date and time management information 223 according to the second embodiment. FIG. 7 is a table of the date and time management information 223 of a multifunction machine 20 according to the second embodiment. As shown in FIG. 7, in a column of date and time management information items that are managed by the date and time information management unit 240, there are management method, ability to change the management method, ability to manually change the date and time information, source for acquisition in an automatic operation, and time interval for acquisition in automatic operation.

As shown in FIG. 7, a column of operation status is generally divided into regular operation and operation under an image processing restriction. Regular operation represents a status in which an image processing restriction is not applied, i.e., a time of day A (8:00 a.m.-17:59 p.m. on weekdays) as shown in the first embodiment. In regular operation, there are two management methods, manual management and automatic management. In manual management, a certain user inputs the time through operation switches 112. In automatic management, the time is set by a host device through an I/F unit 130. The operation under an image processing restriction occurs when the current time of day is within one of the times of day B, C, and D (18:00 p.m.-7:59 a.m. on weekdays) and any time on weekends, during which restrictions are applied, as discussed in the first embodiment.

In the regular operation, the management under the column of the date and time management information items is divided into manual management and automatic management. Under manual management, a user of the multifunction machine 20 corrects the time through the operation switches 112 to amend the date and time information 122. Under automatic management, the time is periodically acquired from an SNTP server through the I/F unit 130 and the date and time information 122 is corrected based on the acquired time. Automatic management is usually chosen in operations under an image processing restriction of the second embodiment. Therefore, a person with malicious intent cannot change the current time in the machine, which makes it difficult to circumvent the restrictions on the machine.

Next, the row denoted with ability to change the status of the management under the column of the date and time management information items indicates whether a user is permitted to change between manual management and automatic management. In regular operation, a request by a user to change between manual management and automatic management is allowed. However, when operating under an image processing restriction, a request by a user to change between manual management and automatic management is not allowed.

The row denoted by ability to rewrite date and time information under the column of the date and time management information items indicates whether correction of the date and time information 122 by a user of the multifunction machine 20 through the operation switches 112 is allowed. Under automatic management, manual correction of the date and time information 122 is not allowed.

The source for acquisition of the current time in an automatic operation is an SNTP server, as shown in FIG. 7. A time interval of acquisition in an automatic operation is ten minutes in the regular operation, and one minute under an image processing restriction, as shown in FIG. 7. When the time interval is shorter, more accurate date and time management is possible.

Figure 8A:
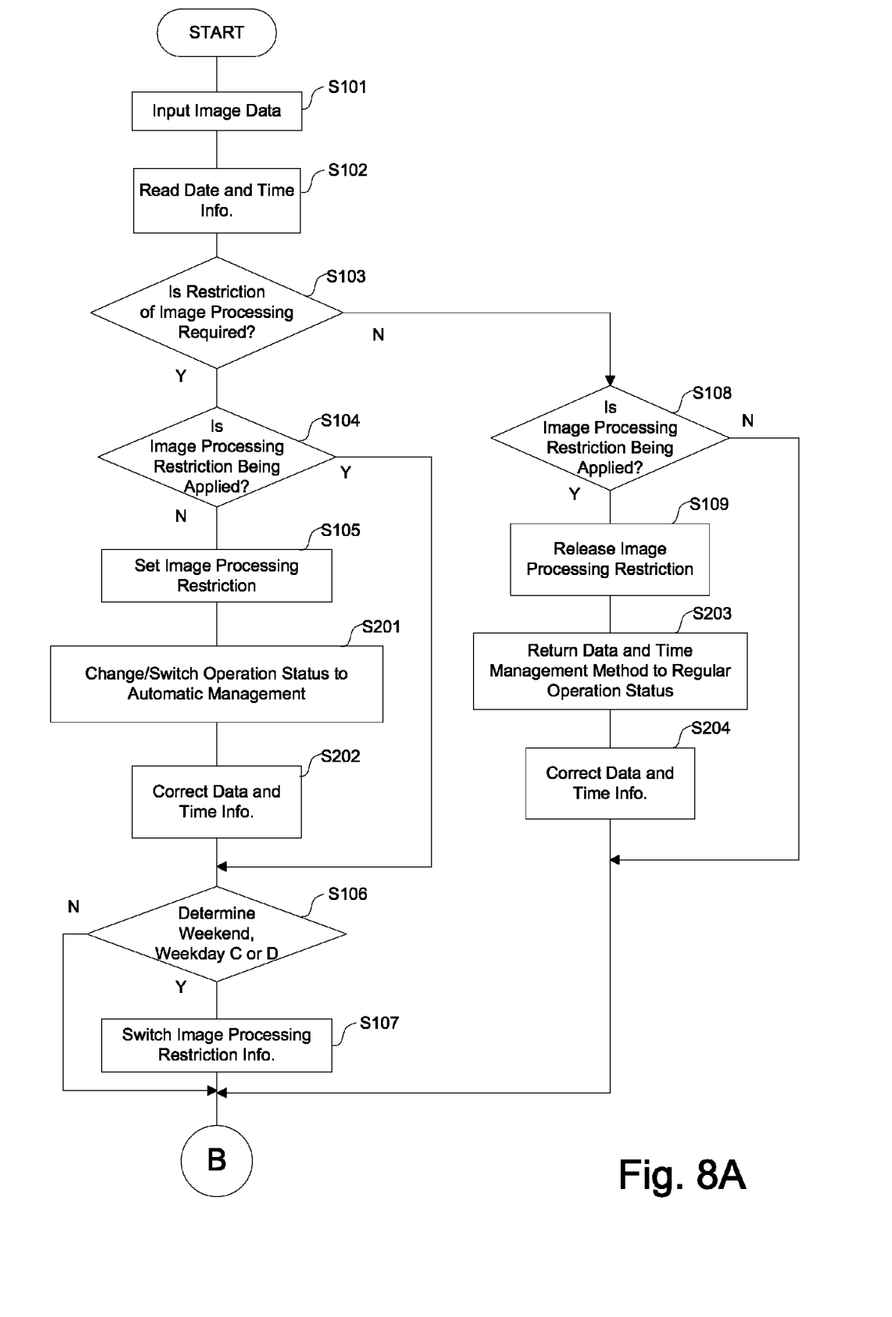
FIGS. 8A and 8B are a flow diagram showing an overall image processing of a multifunction machine according to a second embodiment.
Figure 8B:
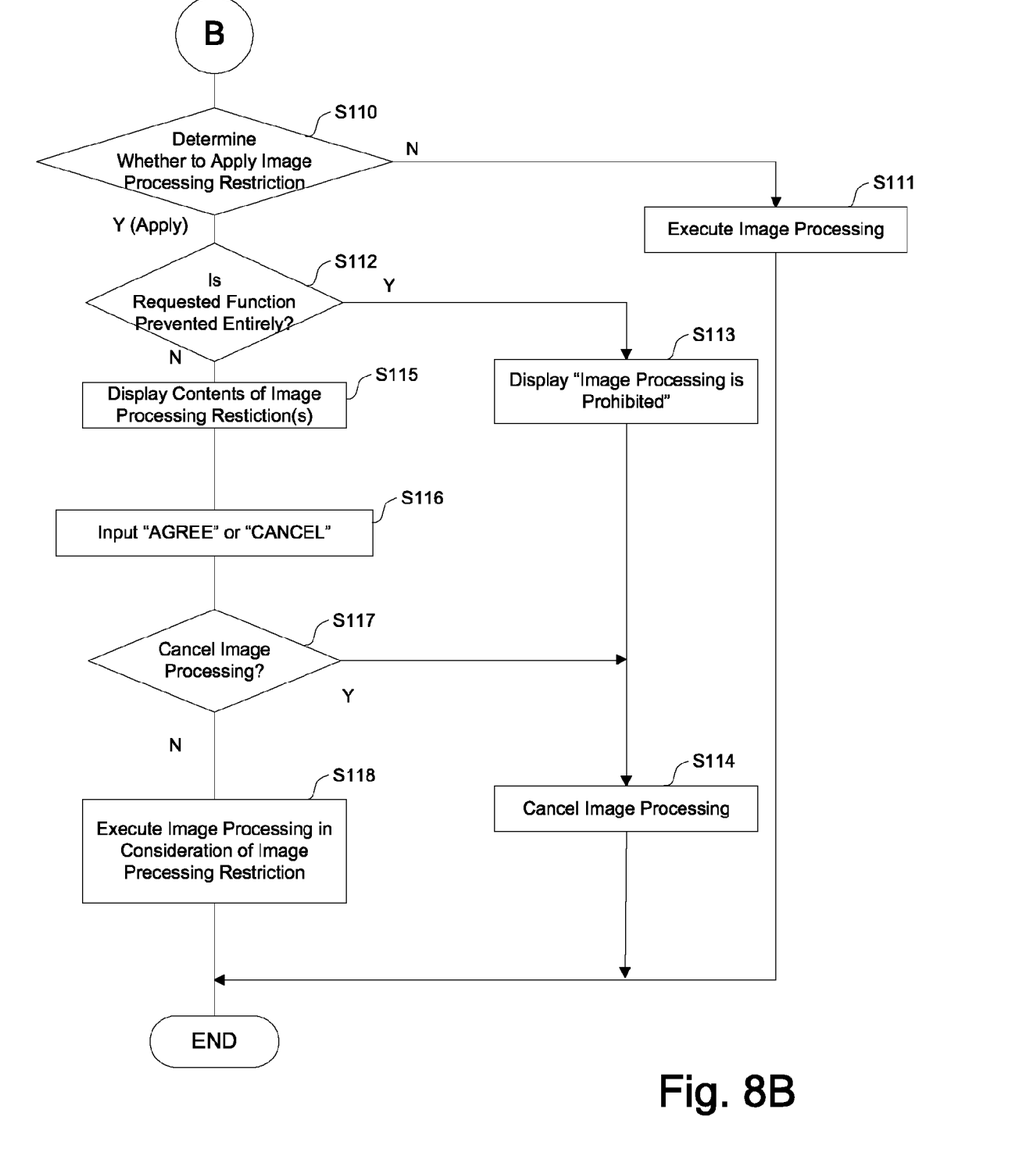

The following is an explanation of overall image processing with the multifunction machine 20 according to the second embodiment. FIGS. 8A and 8B form an overall flow diagram showing image processing of the multifunction machine 20 according to the second embodiment. Several steps are added after steps S105 and S109 compared with the flow diagram of FIGS. 5A and 5B of the first embodiment. Therefore, an operation of the multifunction machine 20 according to the second embodiment is explained below with respect to added steps S210 through S204 with reference to FIGS. 6, 8A and 8B.

(S201) When a device management unit 102 instructs an image processing restriction unit 106 to apply an image processing restriction in S105, the device management unit 102 instructs the date and time information management unit 240 to change the operation status to automatic management in the date and time management information 223.

(S202) Then, the device management unit 102 instructs the date and time information management unit 240 to acquire the current time from a SNTP server through an I/F unit 130 and to correct the date and time information 122.

(S203) When the device management unit 102 instructs the image processing restriction unit 106 to release an image processing restriction in S109, the device management unit 102 instructs the date and time information management unit 240 to return the date and time management information 223 to regular operation status.

(S204) The device management unit 102 instructs the date and time information management unit 240 to determine whether or not to correct the date and time information 122 by management method based on the date and time management information 223 under regular operation status. In other words, when the management method is automatic management, the date and time information 122 is corrected by acquiring the current time from the SNTP server through the I/F unit 130. When the management method is manual management, the date and time information is corrected as to the time inputted by the user of the multifunction machine 20 through operation switches 112.

Figure 9:
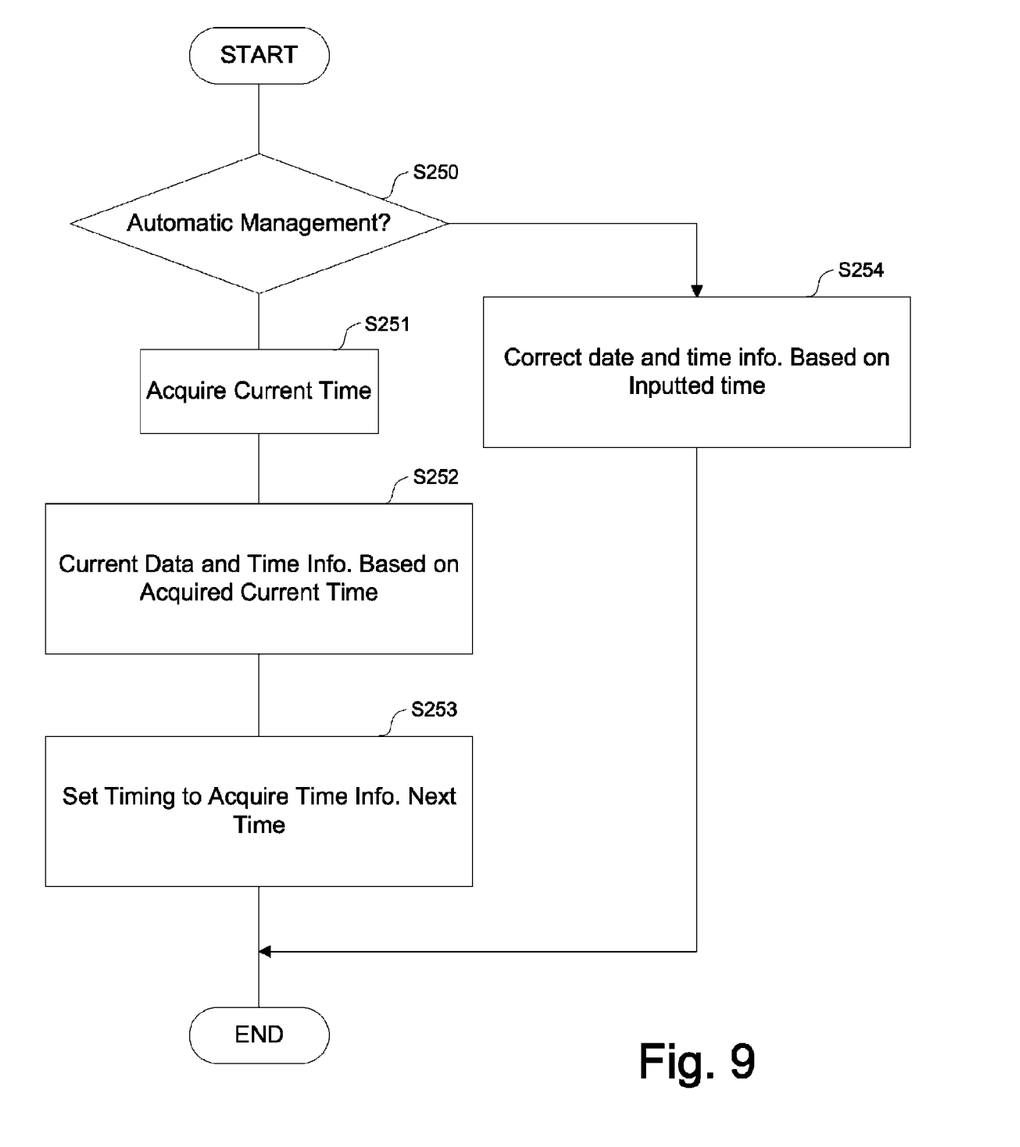
FIG. 9 is a flow diagram showing date and time information update processes according to a second embodiment.

The following is an operation flow of date and time information update processes according to the second embodiment. FIG. 9 is a flow diagram showing date and time information update processes according to the second embodiment. An operation flow of the date and time information update processes according to the second embodiment is explained below in the order of steps S250 through S254.

(S250) A device management unit 102 instructs a date and time information management unit 240 to confirm whether a management method is manual management or automatic management for date and time management method information 223. When the management method is automatic management, the operation goes to S251. When the management method is manual management, the operation goes to S254.

(S251) When the management method is automatic management, the device management unit 102 instructs the date and time information management unit 240 to acquire the current time from a SNTP server, which is designated as the source of acquisition of the current time, through an I/F unit 130.

(S252) The date and time information management unit 240 corrects the date and time information 122 based on the acquired current time.

(S253) The device management unit 102 instructs the date and time information management unit 240 to notify a time interval for acquisition of the current time stored in date and time management method information 223 to the device management unit 102 with respect to the automatic management status. The device management unit 102 instructs a timer (not shown) to count time for the interval to acquire the current time from the SNTP server in a continual manner.

(S254) When the management method is manual management, the date and time information is corrected based on the time inputted by the user of the multifunction machine 20 through operation switches 112, and then an operation is finished.

As discussed above, according to the second embodiment, it is difficult for a person with malicious intent to change the time used for determining the current time of day in the multifunction machine, so that it is difficult to circumvent the restrictions on the machine.

In the first and second embodiments, a multifunction machine is given as an exemplary application of an image processing device. However, in view of the effect of the present application, the security features of this application can be applied to an image forming device, a copier, a facsimile machine, a printer, a scanner and the like.

What is claimed is:

1. An image processing device that performs image processing for first and second functions, comprising:
   a time management unit that is configured to manage time;
   a memory unit that is configured to store image processing restriction information that defines time of day restrictions for the first function and time of day restrictions for the second function;
   a device management unit that is configured to receive an image processing request for image processing of one of the first and second functions; and
   an image processing restriction unit that is configured, based on the time managed by the time management unit, a time of the image processing request and the image processing restriction information, to
      determine an image processing restriction corresponding to the first function if the device management unit receives the image processing request for image processing of the first function, and
      determine an image processing restriction corresponding to the second function if the device management unit receives the image processing request for image processing of the second function, wherein
   the device management unit is configured to perform one of the image processing restriction corresponding to the first function and the image processing restriction to the second function, based on a determination made by the image processing restriction unit.

2. The image processing device according to claim 1, wherein
   the first function is a function relating to a facsimile operation, and
   the second function is a function relating to a scanning operation.

3. The image processing device according to claim 1, wherein
   the first function is a function relating to a facsimile operation, and
   the second function is a function relating to a copying operation.

4. The image processing device according to claim 1, wherein the first function is a function relating to a copying operation, and the second function is a function relating to a scanning operation.

5. The image processing device according to claim 1, wherein the first function is a function relating to a printing operation, and the second function is a function relating to a facsimile operation.

6. The image processing device according to claim 1, wherein the first function is a function relating to a printing operation, and the second function is a function relating to a scanning operation.

7. The image processing device according to claim 1, wherein the first function is a function relating to a printing operation, and the second function is a function relating to a copying operation.

8. The image processing device according to claim 1, wherein the first function is a facsimile reception function, and the second function is a facsimile transmission function.

9. The image processing device according to claim 1, wherein the first function is one of a facsimile reception function and a facsimile transmission function, and the second function is a copying function.

10. The image processing device according to claim 1, wherein the first function is one of a facsimile reception function and a facsimile transmission function, and the second function is a printing function.

11. The image processing device according to claim 1, wherein the first function is one of a facsimile reception function and a facsimile transmission function, and the second function is a scan to email function.

12. The image processing device according to claim 1, wherein the first function is one of a facsimile reception function and a facsimile transmission function, and the second function is a scan to folder function.

13. The image processing device according to claim 1, wherein the first function is one of a facsimile reception function and a facsimile transmission function, and the second function is a scan to USB memory function.

14. The image processing device according to claim 1, wherein the first function is one of a facsimile reception function and a facsimile transmission function, and the second function is a PC scan function.

15. A method for performing image processing for first and second functions, comprising:

managing time by a time management unit;

storing in a memory unit image processing restriction information that defines time of day restrictions of the first function and time of day restrictions of the second function;

receiving an image processing request for image processing of one of the first and second functions;

based on the time managed by the time management unit, a time of the image processing request and the image processing restriction information, determining an image processing restriction corresponding to the first function if the image processing request for image processing of the first function is received, and determining the image processing restriction corresponding to the second function if the image processing request for image processing of the second function is received; and performing an image processing restriction based on the determining of the image processing restriction corresponding to the first function and the determining of the image processing restriction corresponding to the second function.

16. The method according to claim 15, wherein the first function is a function relating to a facsimile operation, and the second function is a function relating to a scanning operation.

17. The method according to claim 15, wherein the first function is a function relating to a facsimile operation, and the second function is a function relating to a copying operation.

18. The method according to claim 15, wherein the first function is a function relating to a copying operation, and the second function is a function relating to a scanning operation.

19. The method according to claim 15, wherein the first function is a function relating to a printing operation, and the second function is a function relating to a facsimile operation.

20. The method according to claim 15, wherein the first function is a function relating to a printing operation, and the second function is a function relating to a scanning operation.

21. The method according to claim 15, wherein the first function is a function relating to a printing operation, and the second function is a function relating to a copying operation.

* * * * *